Oct. 5, 1948.  R. STRUB  2,450,493
TURBINE ROTOR AND ITS METHOD OF MANUFACTURE
Filed Sept. 26, 1944  2 Sheets-Sheet 1
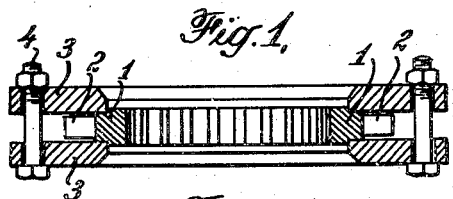
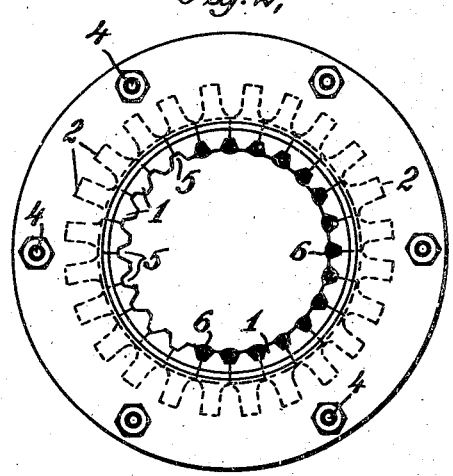
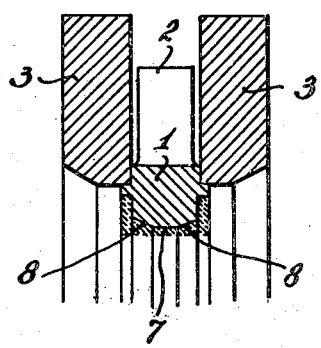
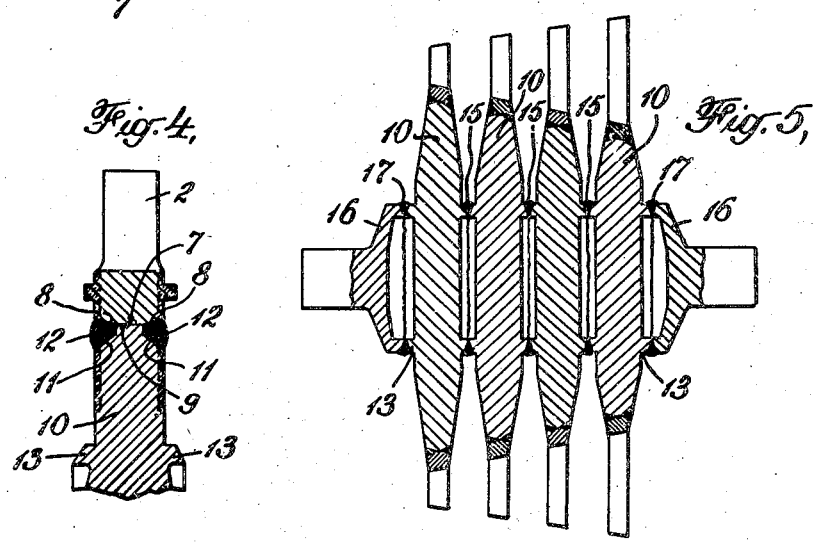
INVENTOR
RENE STRUB
BY
ATTORNEYS

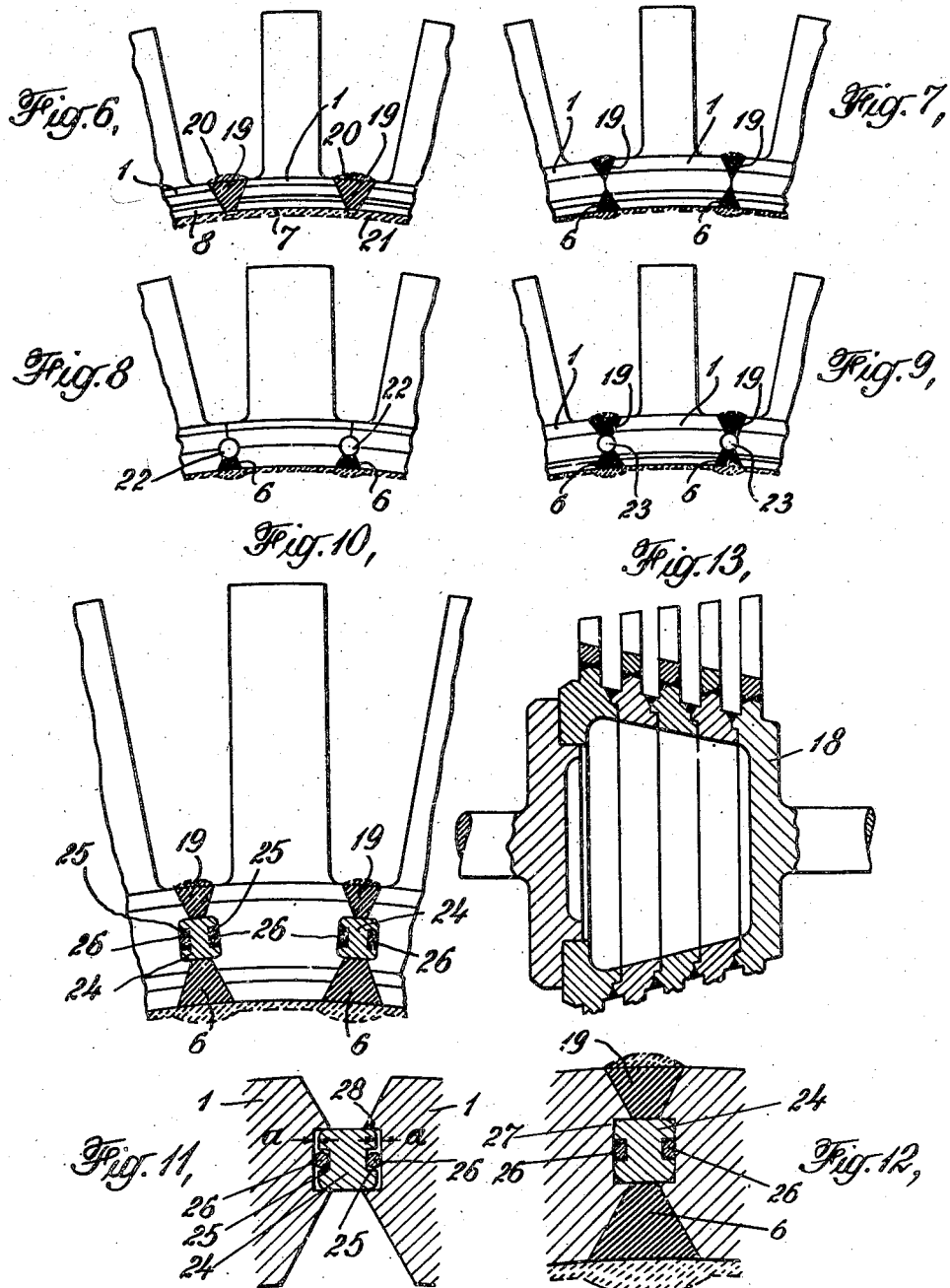

Patented Oct. 5, 1948

2,450,493

UNITED STATES PATENT OFFICE 2,450,493

TURBINE ROTOR AND ITS METHOD OF MANUFACTURE

René Strub, La Chaux-de-Fonds, Switzerland

Application September 26, 1944, Serial No. 555,800
In Switzerland February 25, 1944

5 Claims. (Cl. 253—39)

The invention relates to a method of manufacturing rotors for turbo-machines and to a rotor manufactured according to this method. The method consists in that the blades are first joined to each other by welding to form a built up rim or annular blade assembly, which is afterwards connected as a whole to the blade carrier by welding. The rotor according to the invention is characterised in having welds between the individual blades which hold the individual blades together in the form of a rim or annulus and at least one circumferential weld which connects the rim to the blade carrier and is made over the first welds.

The blade rim can be machined after welding. The blade rim and the blade carrier together can also be machined after having been joined by welding. At the bottom of the welded seams, pins can be inserted between the blade roots. These pins can in given cases be provided with grooves in which bodies deformed by the shrinkage of the weld are placed.

The invention is explained in more detail below with the aid of the accompanying drawings, in which:

Fig. 1 is a cross-section through a clamp fixture holding single turbine blades assembled to form a rim prior to welding;

Fig. 2 is a front view of the fixture of Fig. 1 showing the blade rim after a portion only of the blades have been welded together;

Fig. 3 is a partial cross-section through the fixture of Fig. 1, showing the welded blade rim partially machined;

Fig. 4 is a partial cross-section through an assembled blade carrier and rim showing the joining between blade rim and carrier;

Fig. 5 is a cross-section through a whole rotor built up from several complete blade carriers constructed according to Fig. 4;

Fig. 6 is a partial cross-section taken perpendicular to its intended axis of rotation through a modified form of blade rim in which the blade joining welds are made from the outer perimeter thereof;

Fig. 7 is a similar view to Fig. 6 in which the blade joining welds are made from both the inner and outer perimeters of the blade rim;

Fig. 8 is a view similar to Fig. 6 in which the blade connecting welds are made in weld grooves extending from the inner perimeter of the blade rim and separate pin members are employed to occupy the bottom of each weld groove;

Fig. 9 is a view similar to Fig. 6 in which the blade joining welds are made in grooves extending both outward from the inner perimeter of the blade rim and inward from the outer perimeter of the blade rim, and the groove bottoms of each set of weld grooves is provided by pin members common to both sets of grooves;

Fig. 10 is a partial cross-section through a blade rim taken on a plane perpendicular to its intended axis of rotation in which the blade joining welds are made in weld grooves extending both outward from the inner perimeter of the blade rim and inward from the outer perimeter of the blade rim and the groove bottoms of each set of grooves is provided by a composite multi-membered pin device;

Fig. 11 is a partial cross-section on a larger scale taken on the same plane as Fig. 10 through one of the pin devices assembled in the blade rim prior to welding;

Fig. 12 is a view similar to Fig. 11 after welding; and

Fig. 13 is a view similar to Fig. 5 through a modified form of completed rotor.

The roots 1 (Figs. 1 and 2) of the blades 2 are arranged one against the other between the rings 3 to form a rim, which is held together by means of the bolts 4 through the rings. The inner edges of the blade roots are slanted in such a way that between each pair of blade roots a weld groove 5 comes into existence. Into these grooves is introduced the welding metal forming the weld seam 6.

After the blades have been welded together, the roots are machined as shown in Fig. 3, for instance on a lathe, by means of a milling machine or on a grinding machine. It is expedient for the welded rim to be set up on the machine for treatment together with the ring discs 3. During machining, the part of the rim shaded with broken lines is removed. A cylindrical surface 7 and two bevelled surfaces 8 then come into existence on the inner circumference.

The machined rim is next fitted upon a rotor disc 10 with the cylindrical surface 7 (Fig. 4) on the cylindrical surface 9. The disc also has bevelled surfaces 11, which in combination with the surfaces 8 of the blade rim form welding grooves into which the weld metal forming the circumferential weld 12 is introduced. After the rim 1 has been welded to the rotor disc 10 the part shaded with broken lines is removed by machining.

A number of rotor discs 10 (Fig. 5) already provided with blade rims are fitted together at the welding edges 13 to form a part of a rotor by means of the welds 15. At both ends of this rotor part the axial end pieces 16 are also joined on by means of the welds 17. The rotor is then machined to its final form and balanced.

In the blade rim illustrated in Fig. 6 the blade roots 1 are joined together by means of the welds 19, which are made from the outside. The holder rings must then grip the blades from the inside in order to ensure easy accessibility for the welding tools. After welding, the part 20 of the seams shaded with broken lines is removed by machining, for instance by milling or grinding. The inner circumference is given a cylindrical surface 7 and two tapered surfaces 8 during the following machining. The bottom of the weld 19 is also affected by the removal of the part 21 shaded with broken lines. The only part of the weld which remains in the blade rim is that which can be sufficiently tested during its production and can therefore be faultlessly made. The bottom of the weld, which is less capable of being tested, can then not endanger the rotor during service.

In the blade rim shown in Fig. 7 welds 6 and 19 are made between the blade roots both inside and outside. This form of manufacture has the advantage that the weld grooves do not have to be made so deep, while having a good welding width.

The blade rim shown in Fig. 8 has at the bottom of the welds 6 in each case a round pin 22 which extends across the whole width of the rim. The widening of the groove made possible in this way not only ensures a thorough melting of the weld metal with the blade roots, but also mitigates the conditions of tension, so that cracking during service is obviated.

If welds 6 and 19 respectively (Fig. 9) are made both on the inside and on the outside of the roots of the blade rim, the groove bottom between the welds can be filled by a pin 23 common to both weld grooves.

In the blade rim shown in Fig. 10 pins 24 of approximately square cross-section are inserted between the welds 6 and 19. In these square pins are provided grooves 25 which take a round body, for instance a piece of wire 26, of easily deformed metal.

The pieces of wire 26 (Fig. 11) have before welding a diameter which is greater than the depth of the grooves 25. The blade roots cannot touch each other and between the lateral surfaces of the bar 24 and the bottom surfaces of the grooves 28 provided in the blade roots there remains a distance of the value $a$.

During the cooling after welding, the welds 6 and 19 (Fig. 12) contract and the roots 1 of the blades approach each other. In this way the wires 26 are flattened, the distances between the bar surfaces and the bottom surfaces of the grooves disappear and the bars 24 come to lie against the bottom 27 of the groove. It is thus brought about that no tensions of any significance remain in the welds 6 and 19. Fatigue phenomena and fractures due to them are thus obviated during service.

Instead of welding the blade rims on single discs, these may also be attached on a drum-shaped rotor body 18, as shown in Fig. 13. A disc drilled in the middle and keyed on a shaft or a solid rotor body may also serve as blade carrier.

The invention is specially suitable for turbo-machines which are driven with working media at high temperature, thus for gas turbines and for steam turbines with high steam superheating. The rotors can easily be manufactured with the aid of the method proposed in the invention from materials which have a high fatigue strength, and no mechanical connections of rotor parts are in evidence which might rapidly become loose under the influence of the high temperature and might thus endanger service. The invention can be equally well applied to turbines and compressors whether they are of axial or radial design. The joining of single discs to form a rotor may take place before or after the attachment of the blade rims.

I claim:
1. The method of manufacturing rotors for turbo-machines which comprises arranging a plurality of separate blades in the form of an annulus, welding the roots of each blade directly to the roots of the adjacent blades, machining the unitary annulus thus formed to predetermined dimensions, welding the annulus of blades to a blade carrier, machining the assembled blade and carrier unit thus formed to predetermined dimensions, and then welding a plurality of the carriers together to form a rotor.

2. A built-up turbo-machine rotor including at least one blade carrier member and an annular blade assembly for each such carrier member consisting of a plurality of separate blades joined to one another by welds bonded to the roots of said blades only, each of said assemblies being machined on its inner circumference to fit closely on the periphery of the carrier with which it is associated and joined to that carrier by welding overlying the interblade welds.

3. A rotor according to claim 2 in which there is, intermediate adjacent blades in a blade assembly, a pin member forming the bottom of the welding groove for the interblade weld.

4. A rotor according to claim 2 in which there is a space between the roots of adjacent blades of a blade assembly extending in the direction of the rotor axis, a pin in said space having at least one groove in one of its sides, a yieldable member in said groove and in bearing contact with one of said roots, said member being pressed sufficiently to permit the root to bear against the pin and said pin serving as the bottom of the interblade weld.

5. The method of manufacturing rotors for turbo-machines which includes building up a plurality of separate blades into an annular blade rim by inserting yieldable spacers between adjacent separate blade roots and welding the root of each blade directly to the roots of the adjacent blades whereby the shrinkage of the interblade welds on cooling compresses the spacers, machining the inner circumference of the blade rim thus built up and welding the built-up annular blade rim to the periphery of a blade carrier.

RENÉ STRUB.

REFERENCES CITED

The following references are of record in the file of this patent:

UNITED STATES PATENTS

| Number | Name | Date |
| --- | --- | --- |
| 1,347,031 | Guy | July 20, 1920 |
| 1,470,502 | Steenstrup | Oct. 9, 1923 |
| 1,470,503 | Steenstrup | Oct. 9, 1923 |
| 1,901,704 | Delles | Mar. 14, 1933 |
| 2,200,287 | Lysholm | May 14, 1940 |
| 2,299,449 | Allen | Oct. 20, 1942 |
| 2,354,587 | Franck | July 25, 1944 |
| 2,392,281 | Allen | Jan. 1, 1946 |

FOREIGN PATENTS

| Number | Country | Date |
| --- | --- | --- |
| 113,068 | Great Britain | 1918 |
| 214,461 | Switzerland | July 16, 1941 |
| 218,177 | Switzerland | Mar. 2, 1942 |
| 543,985 | Great Britain | Mar. 23, 1942 |